(12) United States Patent
Kim

(10) Patent No.: US 10,242,131 B2
(45) Date of Patent: Mar. 26, 2019

(54) NUMERICAL SIMULATION SYSTEM AND NUMERICAL SIMULATION METHOD FOR ATMOSPHERIC FLOW BY COMPUTATIONAL FLUID DYNAMICS

(71) Applicant: KOREA INSTITUTE OF ENERGY RESEARCH, Daejeon (KR)

(72) Inventor: Hyun-Goo Kim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 548 days.

(21) Appl. No.: 14/440,019

(22) PCT Filed: Nov. 7, 2013

(86) PCT No.: PCT/KR2013/010080
§ 371 (c)(1),
(2) Date: Apr. 30, 2015

(87) PCT Pub. No.: WO2014/073884
PCT Pub. Date: May 15, 2014

(65) Prior Publication Data
US 2015/0302117 A1    Oct. 22, 2015

(30) Foreign Application Priority Data
Nov. 9, 2012  (KR) .................. 10-2012-0126463

(51) Int. Cl.
*G06F 17/50* (2006.01)
*G01W 1/10* (2006.01)
*G06F 17/10* (2006.01)

(52) U.S. Cl.
CPC ........... *G06F 17/5009* (2013.01); *G01W 1/10* (2013.01); *G06F 17/10* (2013.01); *G06F 2217/16* (2013.01)

(58) Field of Classification Search
None
See application file for complete search history.

(56) References Cited

U.S. PATENT DOCUMENTS

2006/0093393 A1* 5/2006 Fan .................. G03G 15/0291
399/93
2007/0244645 A1* 10/2007 Hara .................. G01W 1/10
702/3

(Continued)

FOREIGN PATENT DOCUMENTS

CN    102663251    *  9/2012
JP    2003185762   *  7/2003

(Continued)

OTHER PUBLICATIONS

Alan Russell Computational Fluid Dynamics Modeling of Atmostpheric Flow Applied to Wind Energy Research Boise State University, Dec. 2009 pp. 1-98.*

(Continued)

*Primary Examiner* — Aniss Chad
*Assistant Examiner* — Cuong V Luu
(74) *Attorney, Agent, or Firm* — McCoy Russell LLP

(57) ABSTRACT

Provided are a numerical simulation system and method for an atmospheric wind flow by computational fluid dynamics. In detail, provided are a numerical simulation system and method for an atmospheric wind flow by computational fluid dynamics capable of more rapidly and efficiently performing a fluid analysis and easily making a wind power resource map by setting an analysis result of a wind direction depending on the same analysis area as an initial condition (second initial condition in the present invention) of an analysis of another wind direction.

10 Claims, 14 Drawing Sheets

(56) References Cited

U.S. PATENT DOCUMENTS

2011/0054868 A1* 3/2011 Kim ................ G01W 1/10
703/9
2014/0095123 A1* 4/2014 Patnaik ............ G01N 33/0075
703/2

FOREIGN PATENT DOCUMENTS

| JP | 4470933 | * | 6/2010 |
| KR | 1020050063616 A | | 6/2005 |
| KR | 20110099509 A | | 9/2011 |
| KR | 2012-0078685 | * | 7/2012 |
| KR | 20120078685 A | | 7/2012 |

OTHER PUBLICATIONS

Sumner, J. et al., "CFD in Wind Energy: The Virtual, Multiscale Wind Tunnel," Energies, vol. 3, No. 5, May 17, 2010, 24 pages.
European Patent Office, Extended European Search Report Issued in Application No. 13853397.1, dated Jun. 17, 2016, Germany, 10 pages.
Jackson, P. et al., "Turbulent Wind Flow Over a Low Hill," Quarterly Journal of the Royal Meteorological Society, vol. 101, No. 430, Oct. 1975, 27 pages.
ISA Korean Intellectual Property Office, International Search Report Issued in Application No. PCT/KR2013/010080, dated Mar. 11, 2014, WIPO, 4 pages.

* cited by examiner

| | FIRST INITIAL CONDITION (SECOND INITIAL CONDITION) | ANALYSIS VALUE | COMPARATIVE EXAMPLE 1 (SECOND) | INVENTIVE EXAMPLE 1 (SECOND) | COMPARATIVE EXAMPLE 2 (SECOND) | INVENTIVE EXAMPLE 2 (SECOND) |
|---|---|---|---|---|---|---|
| 1 | 0 | N | 150 | 150 | 30 | 30 |
| 2 | −N | S | 150 | 45 | 30 | 15 |
| 3 | 0 | E | 150 | 150 | 30 | 30 |
| 4 | −E | W | 150 | 45 | 30 | 15 |
| 5 | 0 | NE | 150 | 150 | 30 | 30 |
| 6 | −NE | SW | 150 | 45 | 30 | 15 |
| 7 | 0 | NW | 150 | 75 | 30 | 30 |
| 8 | −NW | SE | 150 | 45 | 30 | 15 |
| 9 | AVERAGE VALUE OF ANALYSIS VALUES OF N AND NE | NNE | 150 | 75 | 30 | 21 |
| 10 | −NNE | SSW | 150 | 45 | 30 | 15 |
| 11 | AVERAGE VALUE OF ANALYSIS VALUES OF N AND NW | NNW | 150 | 75 | 30 | 21 |
| 12 | −NNW | SSE | 150 | 45 | 30 | 15 |
| 13 | AVERAGE VALUE OF ANALYSIS VALUES OF NE AND E | ENE | 150 | 75 | 30 | 21 |
| 14 | −ENE | WSW | 150 | 45 | 30 | 15 |
| 15 | AVERAGE VALUE OF ANALYSIS VALUES OF NW AND W | WNW | 150 | 75 | 30 | 21 |
| 16 | −WNW | ESE | 150 | 45 | 30 | 15 |
| | TOTAL REQUIRED TIME | | 2400 | 1260 | 480 | 324 |

NUMERICAL SIMULATION SYSTEM AND NUMERICAL SIMULATION METHOD FOR ATMOSPHERIC FLOW BY COMPUTATIONAL FLUID DYNAMICS

CROSS REFERENCE TO RELATED APPLICATIONS

The present application is a U.S. National Phase of International Patent Application Serial No. PCT/KR2013/010080, entitled "NUMERICAL SIMULATION SYSTEM AND NUMERICAL SIMULATION METHOD FOR ATMOSPHERIC FLOW BY COMPUTATIONAL FLUID DYNAMICS," filed on Nov. 7, 2013, which claims priority to Korean Patent Application No. 10-2012-0126463, entitled "NUMERICAL SIMULATION SYSTEM AND NUMERICAL SIMULATION METHOD FOR ATMOSPHERIC FLOW BY COMPUTATIONAL FLUID DYNAMICS," filed on Nov. 9, 2012, the entire contents of each of which are hereby incorporated by reference for all purposes.

TECHNICAL FIELD

The present invention relates to a numerical simulation system and method for an atmospheric wind flow by computational fluid dynamics, and more particularly, to a numerical simulation system and method for an atmospheric wind flow by computational fluid dynamics capable of more rapidly and efficiently performing a numerical simulation for an atmospheric wind flow by setting an analysis result of one wind direction for the same analysis area as an initial condition (second initial condition in the present invention) of an analysis of another wind direction.

BACKGROUND ART

An effort to improve wind power energy has been continuously conducted over the world, and a high increase trend of a wind power generation facility capacity of 26.5% on the average has been continued for the past five years. In 2011, a global wind power generation facility capacity arrives at 241 GW. However, European and American countries as well as Korea have continuously raised a wind power energy supplying target.

In order to accomplish the supplying target as described above, it has become the most important current challenge to find new places in which wind power generators are to be installed. Therefore, each country has conducted an effort to make a wind power resource map more precise than an existing wind power resource map to secure new candidates in which wind power generators are to be installed.

As a current development trend of the wind power resource map, computational fluid dynamics numerical simulation that may accurately reflect a terrain effect in order to increase a spatial resolution of the wind power resource map has been adopted. However, the computational fluid dynamics numerical simulation has a problem that a large calculation load and calculation time are required.

This trend is common in various fields using atmospheric wind flow information, such as construction wind engineering, forest fire diffusion prediction, air pollution diffusion, aviation safety evaluation, and the like, as well as the wind power resource map.

Therefore, as a typical case, making a wind power resource map will be described in detail as an example.

First, in the case in which appropriateness evaluation for building a wind power generation farm is performed by actual measurement, a wind condition tower having a height corresponding to ⅔ or more of a hub height of a wind power generator and including a plurality of anemometers in a height direction is installed and used.

Here, measurement for at least one year or more by the respective anemometers is required, it is required to correct this by a wind speed at an actual hub height, and this should be corrected for twenty years or more, which is a design lifespan of the wind power generator.

In order to solve a problem that a time required for this measurement and analysis is increased and further increase analysis reliability in a wide area, it is required to make a wind power resource map by an atmospheric wind flow numerical simulation.

A typical example of an atmospheric wind flow modeling method for making the wind power resource map may include the following two methods.

A first method, which is a method of using a linear theory model of an atmospheric wind flow by Jackon and Hunt, is appropriate for a flat region in which a terrain change is hardly present.

That is, the first method cannot but be very inaccurate in a terrain having many mountain regions (terrain in which an inclination and a change rate of a local terrain are large) such as Korea.

A second method, which is a method of using a computational wind flow analysis method, has an advantage that an accurate numerical simulation of atmospheric wind flow change characteristics by a terrain is possible.

That is, meteorological variables such as all wind directions, wind speeds, atmosphere stabilities, and the like, that may be meteorologically generated are imposed as individual boundary conditions to numerically simulate an analysis area by computational fluid dynamics numerical simulation system, and an appearance frequency for each wind direction, an appearance frequency for each wind speed, an appearance frequency for each atmosphere stability, and the like, calculated from reliable actually measured data obtained from the wind condition tower are applied as a weight to overlap all meteorological examples with each other, thereby making it possible to make a space distribution of a meteorological-statistically averaged atmospheric wind flow, that is, the wind power resource map.

Here, generally, in a numerical simulation method of an atmospheric wind flow, in the case of a numerical simulation of a middle scale atmospheric wind flow having a size of several hundred kilometers, a time sequential continuous analysis is performed to numerically analyze a process of changing an atmospheric wind flow by a change in solar radiation, or the like, and in the case of a numerical simulation of a microscopic scale atmospheric wind flow having a size of several ten kilometers, a scheme of individually numerically analyzing normal state atmospheric wind flows for each meteorological variable using a dynamic downscaling method and applying a statistical appearance frequency of meteorological variables as a weight to perform overlap is used.

Here, in order to further increase reliability of the wind power resource map, an atmospheric wind flow numerical simulation for all generable meteorological states such as a wind direction, a wind speed, an atmosphere stability, and the like, of synoptic wind or local wind having an influence on an analysis area is required. However, there is a problem that a large amount of calculation load and calculation time cannot but be required in order to analyze all generable meteorological states.

As a wind resource mapping method using a atmospheric wind flow numerical simulation system, which is the above-mentioned second method, Korean Patent Laid-Open Publication No. 10-2005-0063616 (entitled "Wind Resource Mapping Method" and published on Jun. 28, 2005) and Korean Patent Laid-Open Publication No. 10-2011-0099509 (entitled "Wind Resources Mapping System and Method") have been suggested.

DISCLOSURE

Technical Problem

An object of the present invention is to provide a numerical simulation system and method for an atmospheric wind flow by computational fluid dynamics capable of more rapidly and efficiently making a wind power resource map by setting an analysis result of one wind direction for an analysis area as an initial condition (second initial condition in the present invention) of an analysis of another wind direction.

In more detail, an object of the present invention is to provide a numerical simulation system and method for an atmospheric wind flow by computational fluid dynamics capable of more rapidly and accurately performing an analysis and easily making a wind power resource map by inputting a boundary condition and an initial condition through an input unit and using an atmospheric wind flow analysis result in which one wind direction and meteorological variable are imposed as a boundary condition to an analysis area as an initial condition (second initial condition) for analyzing an atmospheric wind flow in which another wind direction and meteorological variable are imposed as a boundary condition.

Technical Solution

In one general aspect, a numerical simulation system for an atmospheric wind flow by computational fluid dynamics includes: a numerical analyzing unit 30 analyzing meteorological variables of an internal area using meteorological variables of a boundary surface of an analysis area A as boundary conditions; an input unit 20 inputting the boundary conditions and an initial condition for a numerical analysis of the numerical analyzing unit 30 and setting analysis sections for the same meteorological variable; and a map forming unit 40 mapping a numerical analysis result by the numerical analyzing unit 30 in connection with geographical information, wherein the input unit 20 inputs an initial condition in which analysis information of a specific meteorological variable by the numerical analyzing unit 30 is reflected for the purpose of different analyses in the same meteorological variable for the analysis area A.

The input unit 20 may include: a first input unit 21 inputting the boundary conditions and a first initial condition for the analysis area A in the numerical analyzing unit 30; and a second input unit 22 inputting a second initial condition in which analysis information on a specific boundary condition by the numerical analyzing unit 30 is reflected in order to analyze different boundary conditions for the same analysis area A in the numerical analyzing unit 30.

The boundary conditions may be a wind direction, a wind speed, and an atmosphere stability, and the numerical analyzing unit 30 may perform an analysis on the atmospheric wind flow for each wind direction section, wind speed section, and atmosphere stability section.

Specific wind directions in which the first initial condition is input may be two adjacent wind directions among an easterly wind, a westerly wind, a southerly wind, and a northerly wind for the analysis area A.

The first initial condition may be set to 0 or the same value as the boundary condition.

In the case of a scalar value, the second initial condition may be an analysis value depending on the numerical analyzing unit 30 for specific wind directions in which the first initial condition is input with respect to wind directions forming an angle of 180 degrees with respect to the respective specific wind directions in which the first initial condition is input.

The initial condition having the scalar value may be any one or more selected among a temperature, turbulent kinetic energy, a turbulent kinetic energy dissipation rate, and a coefficient of kinematic viscosity.

In the case of a vector value, the second initial condition may be an opposite direction value of the analysis value depending on the numerical analyzing unit 30 for the specific wind directions in which the first initial condition is input with respect to the wind directions forming the angle of 180 degrees with respect to the respective specific wind directions in which the first initial condition is input.

The second initial condition may be an average value of two analysis values depending on the numerical analyzing unit 30 for two specific wind direction boundary conditions in which the first initial condition is input with respect to wind directions corresponding to middle directions of the two specific wind direction boundary conditions in which the first initial condition is input.

In the case of a scalar value, the second initial condition may be an analysis value depending on the numerical analyzing value 30 with respect to a wind direction forming an angle of 180 degrees with respect to a specific wind direction having analysis information depending on the numerical analyzing unit 30.

In the case of a vector value, the second initial condition may be an opposite direction value of the analysis value depending on the numerical analyzing value 30 with respect to the wind direction forming the angle of 180 degrees with respect to the specific wind direction having the analysis information depending on the numerical analyzing unit 30.

In another general aspect, a numerical simulation method for an atmospheric wind flow by computational fluid dynamics using the numerical simulation system 100 for an atmospheric wind flow by computational fluid dynamics as described above includes: a lattice system forming step (S10) of setting lattices for the analysis area (A) by a analysis area lattice data generating unit 10; an analyzing step (S20) of analyzing an atmospheric wind flow for each of wind directions, wind speeds, and atmosphere stabilities set for the analysis area (A); and a map forming step (S30) of mapping each analysis result in connection with the geographical information.

The analyzing step (S20) may include: an analysis basic setting step (S21) of setting the wind direction sections, the wind speed sections, and the atmosphere stability sections, which are meteorological variables on which analyses are performed for the analysis area A; a first input step (S22) of inputting a boundary condition and a first initial condition of a specific meteorological variable for the same analysis area A in the numerical analyzing unit 30, by the first input unit 21 of the input unit 20; a first numerical analyzing step (S23) of performing an analysis of the specific meteorological variable using the boundary condition and the first initial condition input in the first input step (S22), by the numerical analyzing unit 30; a second input step (S24) of inputting a second initial condition for analyzing another meteorological variable for the same analysis area A in the numerical analyzing unit 30, by the second input unit 22 of the input unit 20; and a second numerical analyzing step (S25) of performing an analysis of the specific meteorological variable using the second initial condition input in the second input step (S24), by the numerical analyzing unit 30, the second input step (S24) and the second numerical analyzing step (S25) being repeatedly performed in order to analyze each section of all meteorological variables set for the analysis area A.

In the map forming step (S30), an appearance frequency for each section of meteorological variables calculated using actually measured data may be imparted as a weight to overlap analysis results for all sections with each other, thereby calculating a meteorological-statistically averaged meteorological variable value.

Advantageous Effects

Therefore, in the numerical simulation system and method for an atmospheric wind flow by computational fluid dynamics according to the exemplary embodiment of the present invention, it is possible to more rapidly and efficiently make a wind power resource map by setting an analysis result of one wind direction for the analysis area as an initial condition (second initial condition in the present invention) of an analysis of another wind direction.

Particularly, in the numerical simulation system and method for an atmospheric wind flow by computational fluid dynamics according to the exemplary embodiment of the present invention, it is possible to more rapidly and accurately perform an analysis and easily make a wind power resource map by inputting a boundary condition and an initial condition through an input unit and using an atmospheric wind flow analysis result in which one wind direction and meteorological variable are imposed as a boundary condition to an analysis area as an initial condition (second initial condition) for analyzing an atmospheric wind flow in which another wind direction and meteorological variable are imposed as a boundary condition.

In more detail, in the numerical simulation system and method for an atmospheric wind flow by computational fluid dynamics according to the exemplary embodiment of the present invention, first, since two wind directions having a difference of 180 degrees of the atmospheric wind flow flowing along a terrain have two-dimensionally geometric symmetry, an analysis result of a wind direction having a difference of 180 degrees from a specific wind direction is used as an initial condition of the specific wind direction using this feature, thereby making it possible to accelerate a convergence speed.

In addition, second, in the case of middle wind directions between two adjacent wind directions, a convergence speed may be accelerated by applying a principle of a vector sum.

DESCRIPTION OF DRAWINGS

FIG. 14 is a view illustrating required times of Inventive Example 1 and Inventive Example 2 depending on the numerical simulation system and method for an atmospheric wind flow by computational fluid dynamics according to the exemplary embodiment of the present invention and Comparative Examples.

BEST MODE

Hereinafter, a numerical simulation system 100 and method for an atmospheric wind flow by computational fluid dynamics according to an exemplary embodiment of the present invention will be described in detail with reference to the accompanying drawings.

Figure 1:
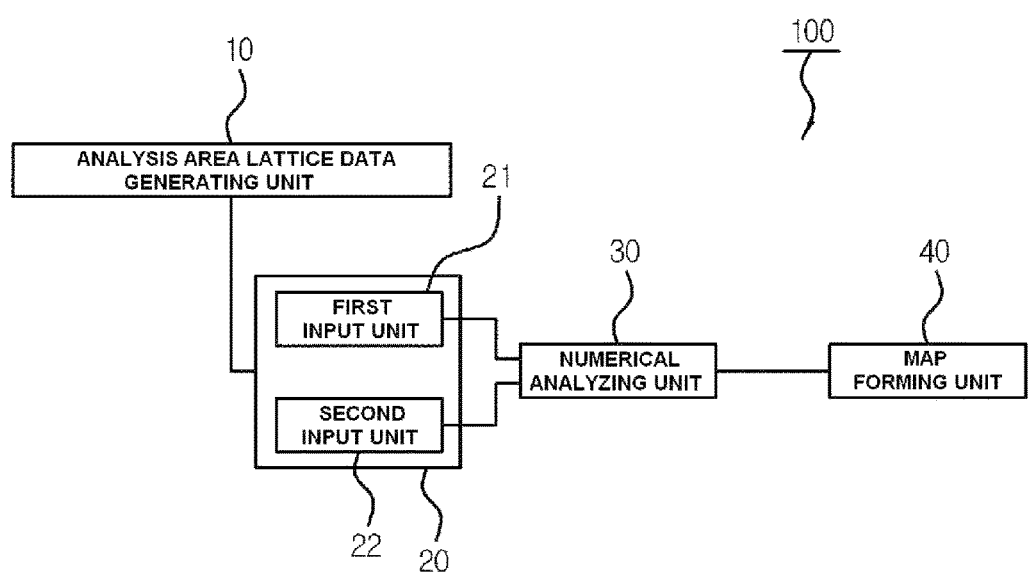
FIG. 1 is a schematic view illustrating a numerical simulation system for an atmospheric wind flow by computational fluid dynamics according to an exemplary embodiment of the present invention.
Figure 2:
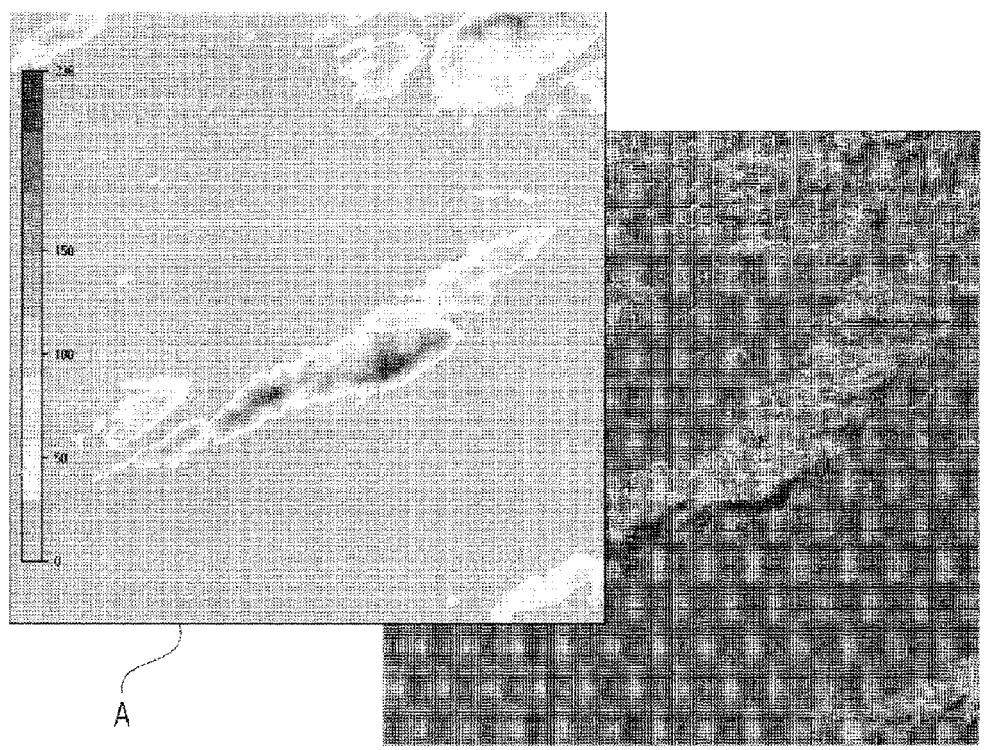
FIG. 2 is a view illustrating an example of operating an analysis area lattice data generating unit of the numerical simulation system for an atmospheric wind flow by computational fluid dynamics according to the exemplary embodiment of the present invention.
Figure 3A:
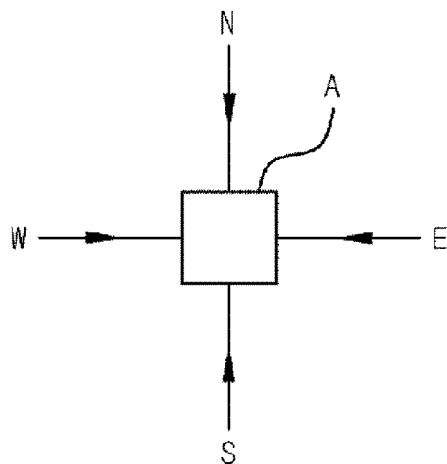
FIGS. 3A to 3C are views illustrating the number of analysis wind directions for an analysis area of the numerical simulation system for an atmospheric wind flow by computational fluid dynamics according to the exemplary embodiment of the present invention.
Figure 3B:
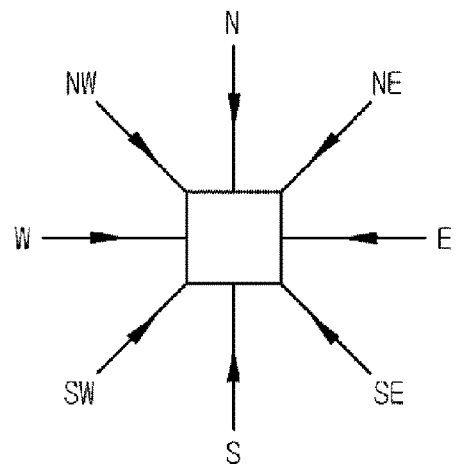
Figure 3C:
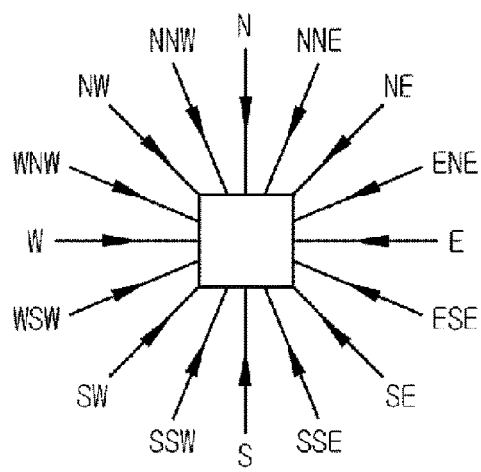
Figure 4A:
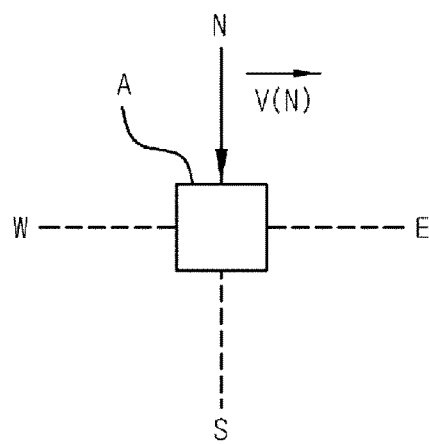
FIGS. 4A and 4B are views illustrating an example of setting a second initial condition of the numerical simulation system for an atmospheric wind flow by computational fluid dynamics according to the exemplary embodiment of the present invention.
Figure 4B:
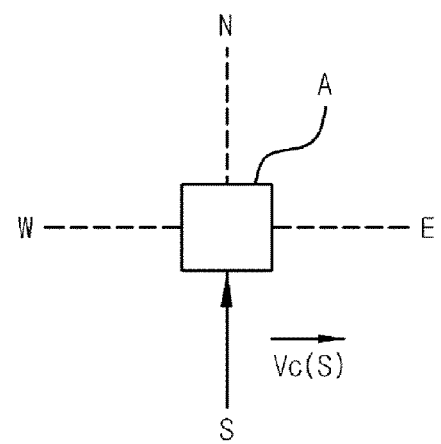
Figure 5:
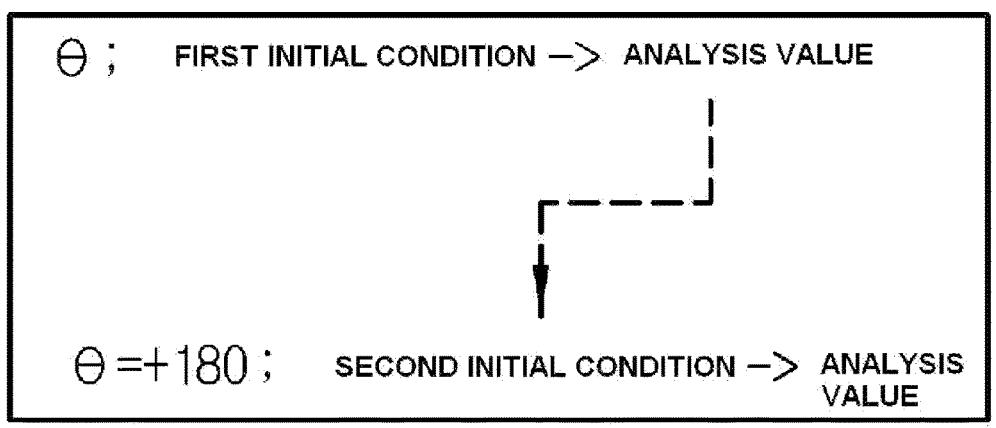
FIG. 5 is a view for describing setting of the second initial condition in a wind direction condition illustrated in FIG. 4.
Figure 5:
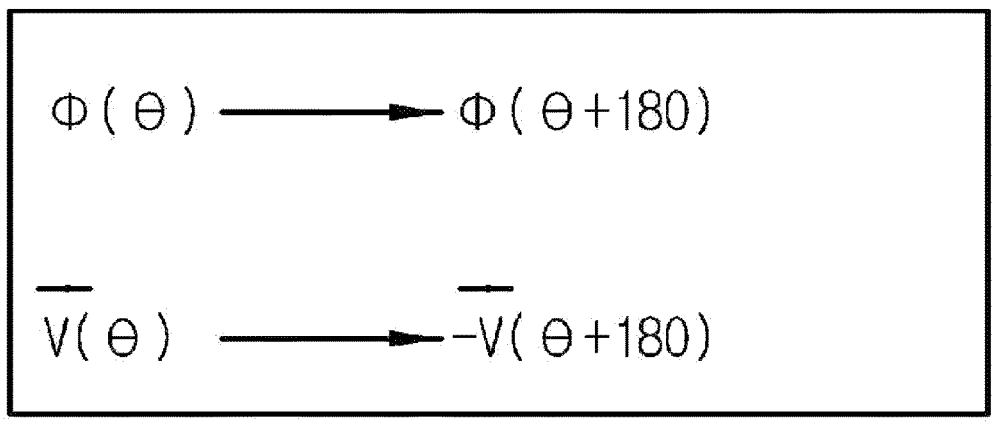
Figure 6A:
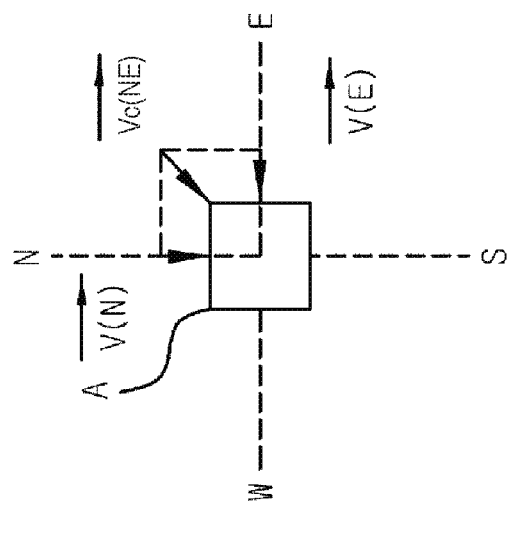
FIGS. 6A and 6B are views illustrating another example of setting a second initial condition of the numerical simulation system for an atmospheric wind flow by computational fluid dynamics according to the exemplary embodiment of the present invention.
Figure 6B:
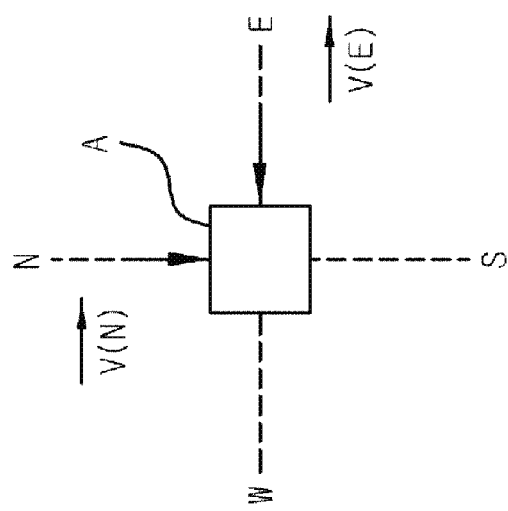
Figure 7:
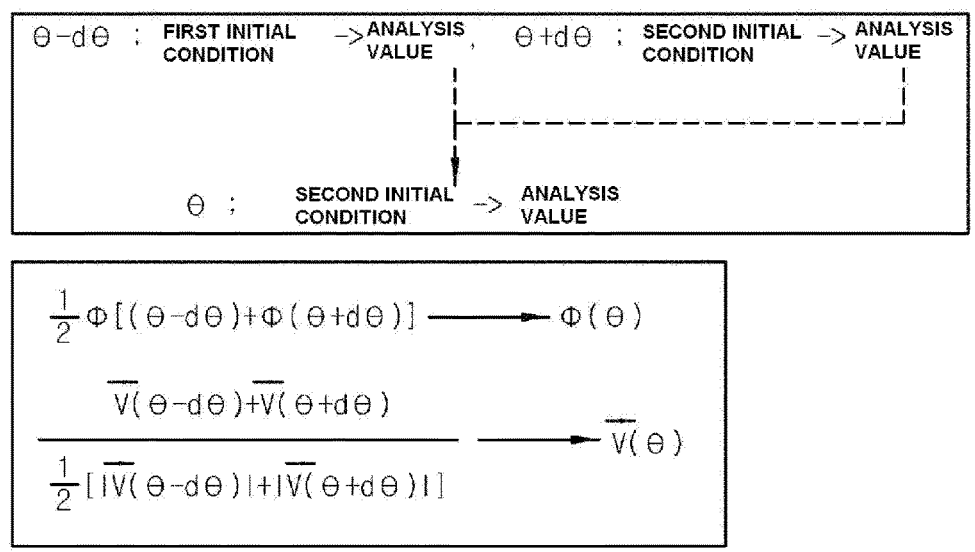
FIG. 7 is a view for describing setting of the second initial condition in a wind direction condition illustrated in FIG. 6.
Figure 8:
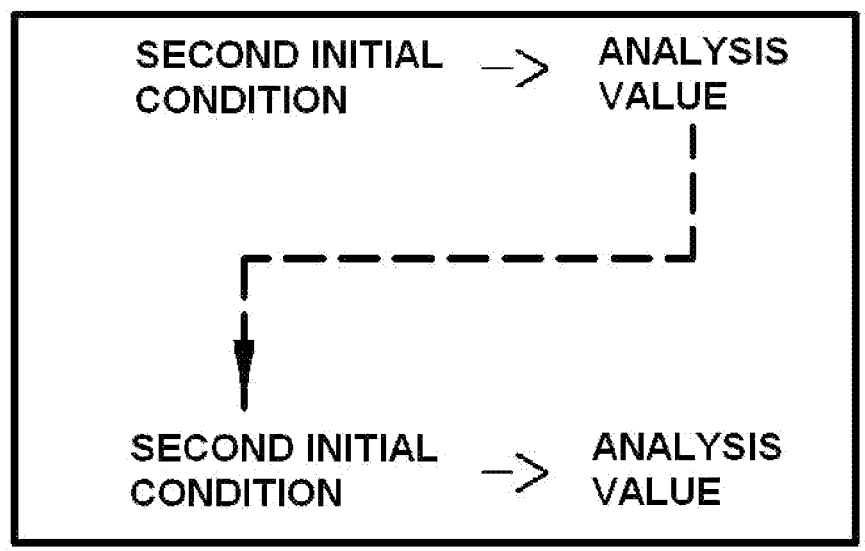
FIG. 8 is a view illustrating still another example of setting a second initial condition of the numerical simulation system for an atmospheric wind flow by computational fluid dynamics according to the exemplary embodiment of the present invention.
Figure 9:
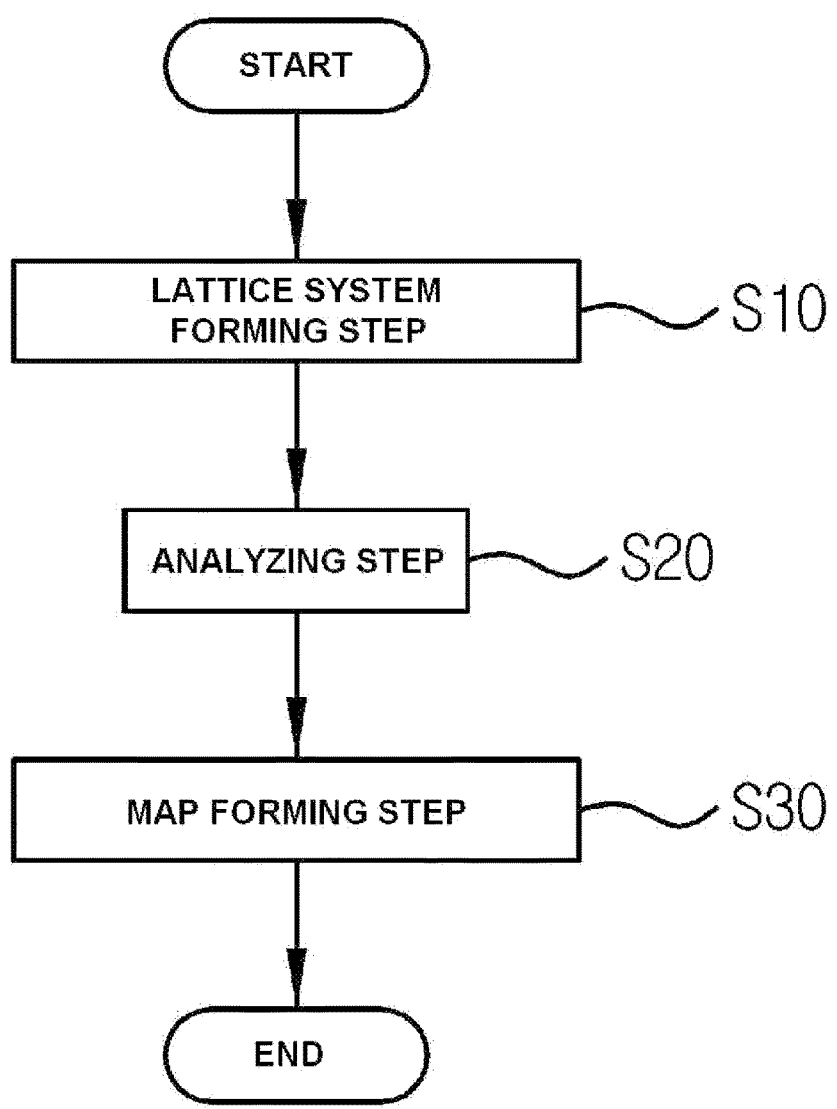
FIG. 9 is a view illustrating a numerical simulation method for an atmospheric wind flow by computational fluid dynamics according to the exemplary embodiment of the present invention.
Figure 10:
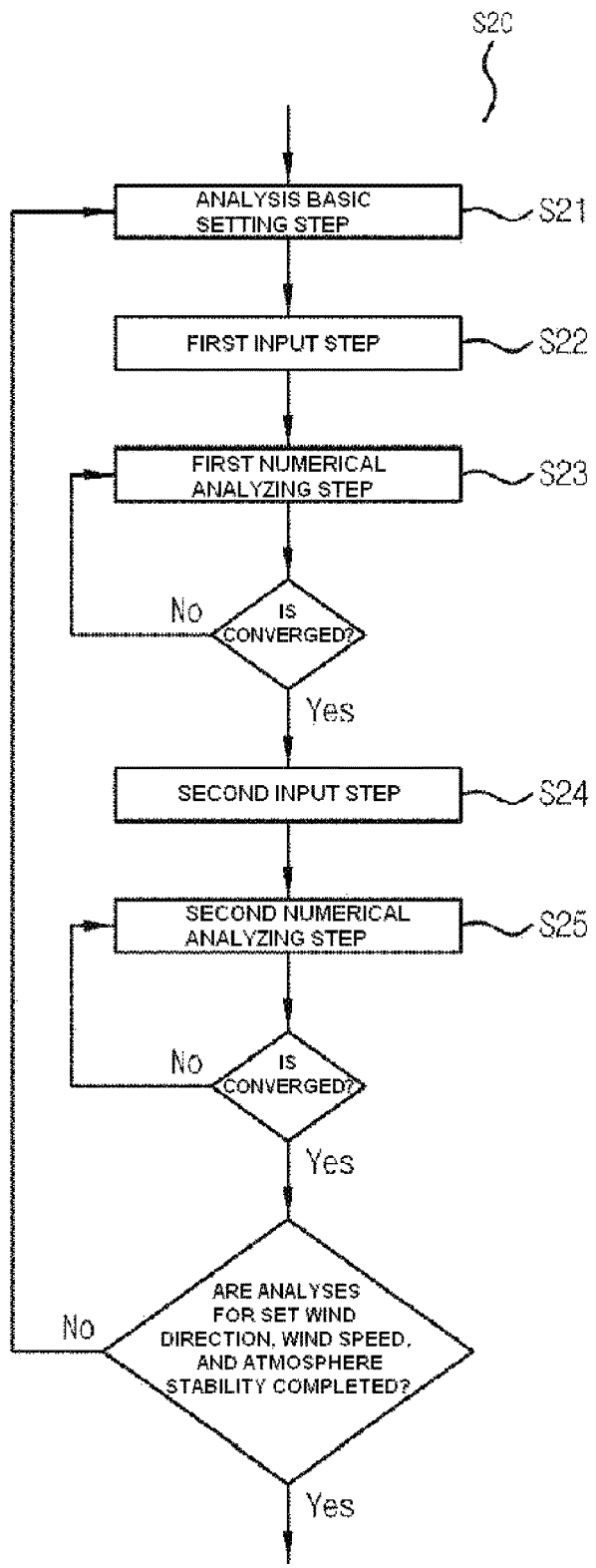
FIG. 10 is a view illustrating an analyzing step for making a wind power resource map according to the exemplary embodiment of the present invention.
Figure 11:
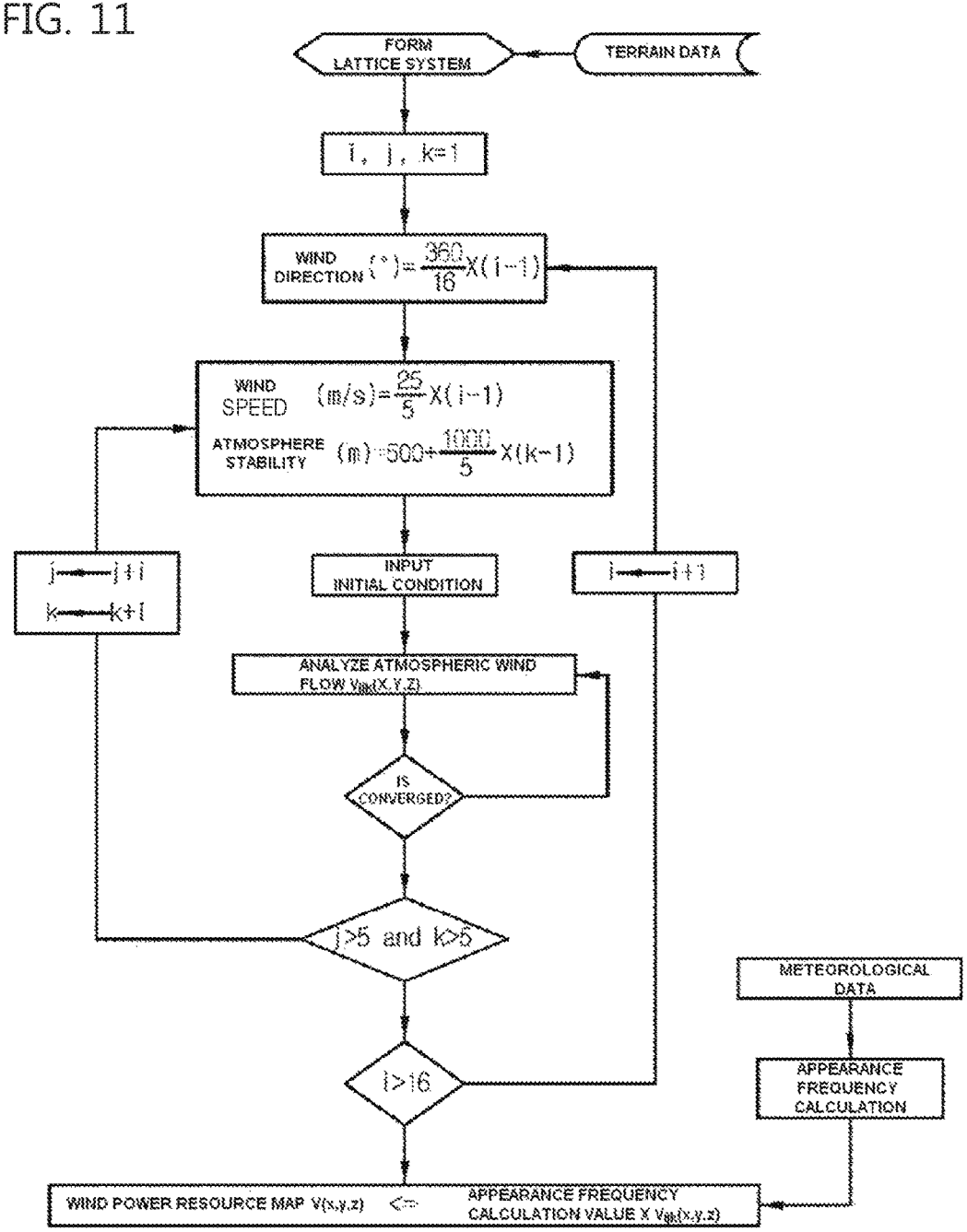
FIG. 11 is a flow chart illustrating an example of the numerical simulation method for an atmospheric wind flow by computational fluid dynamics according to the exemplary embodiment of the present invention.

FIG. 1 is a schematic view illustrating a numerical simulation system for an atmospheric wind flow by computational fluid dynamics according to an exemplary embodiment of the present invention; FIG. 2 is a view illustrating an example of operating an analysis area lattice data generating unit of the numerical simulation system for an atmospheric wind flow by computational fluid dynamics according to the exemplary embodiment of the present invention; FIGS. 3A to 3C are views illustrating the number of analysis wind directions for an analysis area of the numerical simulation system for an atmospheric wind flow by computational fluid dynamics according to the exemplary embodiment of the present invention; FIGS. 4A and 4B are views illustrating an example of setting a second initial condition of the numerical simulation system for an atmospheric wind flow by computational fluid dynamics according to the exemplary embodiment of the present invention; FIG. 5 is a view for describing setting of the second initial condition in a wind direction condition illustrated in FIG. 4; FIGS. 6A and 6B are views illustrating another example of setting a second initial condition of the numerical simulation system for an atmospheric wind flow by computational fluid dynamics according to the exemplary embodiment of the present invention; FIG. 7 is a view for describing setting of the second initial condition in a wind direction condition illustrated in FIG. 6; FIG. 8 is a view illustrating still another example of setting a second initial condition of the numerical simulation system for an atmospheric wind flow by computational fluid dynamics according to the exemplary embodiment of the present invention; FIG. 9 is a view illustrating a numerical simulation method for an atmospheric wind flow by computational fluid dynamics according to the exemplary embodiment of the present invention; FIG. 10 is a view illustrating an analyzing step for making a wind power resource map according to the exemplary embodiment of the present invention; FIG. 11 is a flow chart illustrating an example of the numerical simulation method for an atmospheric wind flow by computational fluid dynamics according to the exemplary embodiment of the present invention; FIGS. 12A to 13B are views illustrating results depending on the numerical simulation system and method for an atmospheric wind flow by computational fluid dynamics according to the exemplary embodiment of the present invention; and FIG. 14 is a view illustrating required times of Inventive Example 1 and Inventive Example 2 depending on the numerical simulation system and method for an atmospheric wind flow by computational fluid dynamics according to the exemplary embodiment of the present invention and Comparative Examples.

The numerical simulation system 100 for an atmospheric wind flow by computational fluid dynamics according to the exemplary embodiment of the present invention may include a numerical analyzing unit 30, an input unit 20, and a map forming unit 40, and further include an analysis area lattice data generating unit 10 (See FIG. 1).

The analysis area lattice data generating unit 10 generates lattice data in which an analysis area A on which a numerical analysis is performed by reflecting a space in which a fluid flows is divided into a plurality of lattices.

The analysis area lattice data generating unit 10 generates a plurality of lattices in the analysis area for a finite volume method, which is performed for analyzing the computational fluid dynamics.

In FIG. 2, which is a view illustrating a map and lattice data generated by the analysis area lattice data generating unit 10, an entire area including a plurality of lattices corresponds to the analysis area A.

Although FIG. 2 has a two-dimensional plane form of a length and a width, an area in which an atmospheric wind flow is actually formed has a three-dimensional space form, and the respective lattices actually form polyhedrons such as a plurality of hexahedrons, or the like.

Here, in the exemplary embodiment of the present invention, the lattices may be intersection points perpendicular to each other, as illustrated in FIG. 2, or may not be in a form in which they are perpendicular to each other in consideration of an area in which input data for terrain and numerical analysis may be measured and observed, or the like.

That is, in the exemplary embodiment of the present invention, the analysis area lattice data generating unit 10, which generates the lattice data in a lattice form in order to analyze the analysis area A using the finite volume method, may variously generate the lattice data by reflecting geographical information.

The numerical analyzing unit 30 performs an atmospheric wind flow analysis with respect to meteorological variables set for the analysis area A.

Here, the numerical analyzing unit 30 analyzes the analysis area A for each meteorological variable, and analyses are performed on the respective meteorological variables by the number of set sections.

The input unit 20 inputs a boundary condition and an initial condition of the numerical analyzing unit 30 and sets the number of analyses for the same meteorological variable.

The input unit 20 may not only set the number of analyses by a direct input of a user, but also set the number of analyses by inputting an automatically set boundary condition or an analysis result by calculation.

The input data, which means basic data required for an analysis of the numerical analyzing unit 30, includes a boundary condition and an initial condition. The boundary condition may be a wind direction, a wind speed, and an atmosphere stability, and the initial condition may be one or more selected among turbulent energy, a dissipation rate, and a coefficient of kinematic viscosity.

Here, the number of analyses of the analysis area A may be changed depending on the number (analysis section) of analyses of the wind directions, the number (analysis section) of analyses of the wind speeds, and the number (analysis section) of analyses of the atmosphere stabilities, which are the boundary conditions.

Particularly, the number of analysis wind directions of the analysis area A means the number of analyses performed through the numerical analyzing unit 30 on the respective wind directions having an influence on the analysis area A in all directions.

FIGS. 3A to 3C are views illustrating the number of analysis wind directions for the analysis area A. FIG. 3A illustrates an example in which a total of four analyses for an easterly wind, a westerly wind, a southerly wind, and a northerly wind are performed on the analysis area A.

In addition, FIG. 3B illustrates an example in which a total of eight analyses for an easterly wind, a westerly wind, a southerly wind, a northerly wind, a southeasterly wind, a southwesterly wind, a northeasterly wind, and a northwesterly wind are performed on the analysis area A.

In addition, FIG. 3C illustrates an example in which a total of sixteen analyses for an easterly wind, a westerly wind, a southerly wind, a northerly wind, a southeasterly wind, a southwesterly wind, a northeasterly wind, a northwesterly wind, an east-southeasterly wind, an east-northeasterly wind, a west-southwesterly wind, a west-northwesterly wind, a south-southeasterly wind, a south-southwesterly wind, a north-northeasterly wind, and a north-northwester wind are performed on the analysis area A.

The numerical simulation system 100 for an atmospheric wind flow by computational fluid dynamics according to the exemplary embodiment of the present invention may further variously analyze a plurality of wind directions for the analysis area A, in addition to the numbers of wind directions illustrated in FIGS. 3A to 3C. This may be set by the input unit 20, as described above.

The input unit 20 may input the boundary condition and the initial condition for the numerical analysis of the numerical analyzing unit 30. Here, the input unit 20 may input input data in which analysis information of a specific meteorological variable by the numerical analyzing unit 30 is reflected for the purpose of different analyses in the same meteorological variable for the analysis area A.

The "different analyses in the same meteorological variable for the analysis area A" means analyses repeatedly performed depending on setting of a plurality of analysis sections of a specific meteorological variable.

In more detail, the input unit 20 includes a first input unit 21 inputting the boundary condition and a first initial condition for the analysis area A in the numerical analyzing unit 30 and a second input unit 22 inputting a second initial condition in which analysis information on a specific boundary condition by the numerical analyzing unit 30 is reflected in order to analyze different boundary conditions for the same analysis area A in the numerical analyzing unit 30.

That is, the input unit 20 is configured of the first input unit 21 inputting the boundary condition and the first initial condition and the second input unit 22 inputting the second initial condition. The boundary condition and the initial conditions are information required for the purpose of the analysis of the numerical analyzing unit 30.

The boundary condition means a value imparted for a meteorological variable of a boundary surface in order to analyze an internal meteorological variable of the analysis area A, and the first initial condition means a condition for an initial analysis of a specific meteorological variable for the analysis area A.

In addition, the second initial condition means a condition in which analysis information of a specific wind direction in an analysis performed in advance in order to analyze sections other than sections on which an analysis is performed on the specific meteorological variable for the analysis area A is reflected.

In other words, in the exemplary embodiment of the present invention, the first and second initial conditions are conditional values input to the analysis area A, and the second initial condition is a condition under which a value in which a result of the analysis performed in advance is reflected is input.

Here, in the numerical simulation system 100 for an atmospheric wind flow by computational fluid dynamics according to the exemplary embodiment of the present invention, a numerical analysis in which the first initial condition is input is about specific wind direction sections. In this case, it is preferable that specific wind directions in which the first initial condition is input are two adjacent wind directions among an easterly wind, a westerly wind, a southerly wind, and a northerly wind.

In addition, the first initial condition may be set to 0 or the same value as the boundary condition.

Hereinafter, it will be described how a value in which the result of the analysis performed in advance is reflected is concretely used, as the second initial condition.

First, as the second initial condition, analysis information depending on the numerical analyzing unit 30 on specific wind directions in which the first initial condition is input with respect to wind directions forming an angle of 180 degrees with respect to the respective specific wind directions in which the first initial condition is input may be used.

FIGS. 4A and 4B, which are views illustrating that an analysis value of a northerly wind may be input as an initial conditions of a southerly wind in the case in which the specific wind direction in which the first initial condition is input is the northerly wind, representatively illustrate a vector value.

In addition, FIG. 5, which is a view for describing that an analysis value of the first initial condition for wind directions forming an angle of 180 degrees with respect to the respective specific wind directions as illustrated in FIG. 4 may be used as the second initial condition, illustrates a case having a scalar value by a sign $\Phi$ and illustrates a case having a vector value by a sign $\vec{V}$.

First, in the case in which the first initial condition, the analysis value, and the second initial condition are scalar values, an analysis value depending on the numerical analyzing unit 30 on specific wind directions in which the first initial condition is input with respect to wind directions forming an angle of 180 degrees with respect to the respective specific wind directions in which the first initial condition is input may be used as the second initial condition.

In more detail, an analysis value $\Phi(\theta)$ for a wind direction having an angle $\theta$ may be used as an initial condition $\Phi(\theta+180)$ having an angle $\theta+180$.

Here, an initial condition having the scalar value may be any one or more selected among a temperature, turbulent kinetic energy, a turbulent kinetic energy dissipation rate, and a coefficient of kinematic viscosity.

In addition, in the case in which the first initial condition, the analysis value, and the second initial condition are vector values, an opposite direction value of an analysis value depending on the numerical analyzing unit 30 on specific wind directions in which the first initial condition is input with respect to wind directions forming an angle of 180 degrees with respect to the respective specific wind directions in which the first initial condition is input may be used as the second initial condition.

That is, an analysis value $\vec{V}(\theta)$ for a wind direction having an angle $\theta$ may be used as an initial condition $\vec{V}(\theta+180)$ having an angle $\theta+180$.

In more detail, for example, in the case of a northerly wind and a southerly wind having a difference of 180 degrees therebetween, in FIG. 4A, $\vec{V}(N)$ indicating northerly wind analysis information of the northerly wind of a specific analysis area A, which is an analysis result after the first initial condition is input, may be used as a second initial condition of the southerly wind.

Here, In FIG. 4B, $\vec{Vc}(S)$ indicates the second initial condition of the southerly wind. As illustrated, a negative value $-\vec{V}(N)$ of information analyzed after the first initial condition is input is used as the second initial condition of the southerly wind forming an angle of 180 degrees with respect to the northerly wind.

That is, the numerical simulation system 100 for an atmospheric wind flow by computational fluid dynamics according to the exemplary embodiment of the present invention may set the analysis information of the northerly wind as the second initial condition of the southerly wind.

In addition, the numerical simulation system 100 for an atmospheric wind flow by computational fluid dynamics according to the exemplary embodiment of the present invention includes examples illustrated in FIGS. 4A and 4B, may be applied to all wind directions forming an angle of 180 degrees with respect to each other, and may input the analysis result in which the first initial condition for the specific wind direction is input as the second initial condition for another wind direction forming an angle of 180 degrees with respect to the specific wind direction for the specific analysis area A (for example, analysis information of a southerly wind is set as a second initial condition of a northerly wind or analysis information of an easterly wind is set as a second initial condition of a westerly wind).

Second, an average value of the analysis value depending on the numerical analyzing unit 30 may be used as the second initial condition.

In more detail, an average value of two analysis values depending on the numerical analyzing unit 30 for two specific wind direction boundary conditions in which the first initial condition is input with respect to wind directions corresponding to middle directions of the two specific wind direction boundary conditions in which the first initial condition is input may be used.

Referring to FIGS. 6A and 6B, in FIG. 6A, $\vec{V}(N)$ indicates northerly wind analysis information of a specific analysis area A and $\vec{V}(K)$ indicates easterly wind analysis information, which are analysis results after the first initial condition is input to each of the northerly wind and the easterly wind.

Here, in FIG. 6B, $\vec{V}c(NE)$ indicates a second initial condition of a north-easterly wind. As illustrated, a vector sum $\vec{V}(N)+\vec{V}(K)$ of analysis information of northerly wind and easterly wind boundary conditions is used.

That is, an average value of the analysis information of the northerly wind and the easterly wind may be set as the second initial condition.

FIG. 7, which is a view illustrating that an average value of analysis values of wind direction boundary conditions having angles of θ−dθ and θ+dθ, as illustrated in FIGS. 6A and 6B may be used as a second initial condition of an angle of θ, illustrates an average value calculation equation in the case of having a scalar value and in the case of having a vector value.

Here, Φ(θ−dθ) means an analysis value of a wind direction having an angle of θ−dθ in the case when it is a scalar value, Φ(θ+dθ) means an analysis value of a wind direction having an angle of θ+dθ in the case when it is a scalar value, $\vec{V}$(θ−dθ) means an analysis value of a wind direction having an angle of θ−dθ in the case when it is a vector value, and $\vec{V}$(θ+dθ) means an analysis value of a wind direction having an angle of θ+dθ in the case when it is a vector value.

In addition, Φ(θ) means a second initial condition of a wind direction having an angle of θ in the case in which it is a scalar value and $\vec{V}$(θ) means a second initial condition of a wind direction having an angle of θ in the case in which it is a vector value.

In other words, the numerical simulation system 100 for an atmospheric wind flow by computational fluid dynamics according to the exemplary embodiment of the present invention may use the average value of the analysis values of the analysis information on the specific wind directions as the second initial condition of the wind direction having an angle therebetween.

Third, as illustrated in FIG. 8, an analysis value depending on the second initial condition may be used as another second initial condition.

Here, in the case of a scalar value, an analysis value depending on the numerical analyzing unit 30 with respect to a wind direction forming an angle of 180 degrees with respect to the specific wind direction having the analysis information depending on the numerical analyzing unit 30 is used as the second initial condition, and in the case of a vector value, an opposite direction value of the analysis value depending on the numerical analyzing unit 30 with respect to the wind direction forming the angle of 180 degrees with respect to the specific wind direction having the analysis information depending on the numerical analyzing unit 30 is used as the second initial condition.

That is, the analysis value analyzed after the second initial condition of the northeasterly wind illustrated in FIGS. 6A and 6B is input is input as the second initial condition of the southwesterly wind forming the angle of 180 degrees with respect to the northeasterly wind, such that the analysis of the numerical analyzing unit 30 may be performed.

When the analysis is performed after the first initial condition is input with respect to two adjacent wind directions selected among the easterly wind, the westerly wind, the southerly wind, and the northerly wind by the first to third methods described above, the second initial condition using the analysis result (analysis information) is input, such that all of the analyses of the wind direction information illustrated in FIG. 3C may be completed.

Here, the numerical simulation system 100 for an atmospheric wind flow by computational fluid dynamics according to the exemplary embodiment of the present invention has an advantage that a time required for the analysis may be significantly decreased in the case in which the second initial condition in which the analysis result is reflected is input to perform the analysis as compared with in the case in which the first initial condition is reflected.

That is, in the numerical simulation system 100 for an atmospheric wind flow by computational fluid dynamics according to the exemplary embodiment of the present invention, first, since two wind directions having a difference of 180 degrees of the atmospheric wind flow flowing along a terrain have two-dimensionally geometric symmetry, the analysis result (analysis result of the wind direction to which the first initial condition is input) of the wind direction having a difference of 180 degrees from the specific wind direction is used as the initial condition (second initial condition) of the specific wind direction using this feature, thereby making it possible to accelerate a convergence speed.

In addition, second, in the case of middle wind directions between two adjacent wind directions, a convergence speed may be accelerated by applying a principle of a vector sum.

(Particularly, as an angle difference between the two adjacent wind directions is small, an influence of the terrain on the atmospheric wind flow is decreased, and in the numerical simulation system and method for an atmospheric wind flow by computational fluid dynamics according to the exemplary embodiment of the present invention, the number of wind directions in which the analyses are performed is adjusted, thereby making it possible to adjust the angle difference between the two adjacent wind directions.)

The map forming unit 40 maps the numerical analysis result by the numerical analyzing unit 30 in connection with the geographical information.

Meanwhile, the numerical simulation method for an atmospheric wind flow by computational fluid dynamics according to the exemplary embodiment of the present invention uses the numerical simulation system 100 for an atmospheric wind flow by computational fluid dynamics having the features as described above. Next, the numerical simulation method for an atmospheric wind flow by computational fluid dynamics using the numerical simulation system 100 for an atmospheric wind flow by computational fluid dynamics will be described in more detail.

An example in which the numerical simulation method for an atmospheric wind flow by computational fluid dynamics according to the exemplary embodiment of the present invention includes a lattice system forming step (S10), an analyzing step (S20), and a map forming step (S30) is illustrated (See FIG. 9).

In the lattice system forming step (S10), lattices are set using terrain data by the analysis area lattice data generating unit 10.

In the analyzing step (S20), an atmospheric wind flow is analyzed for each of set wind direction sections, wind speed sections, and atmosphere stability sections.

FIG. 10 is a view illustrating the analyzing step (S20) in detail. The analyzing step (S20) includes an analysis basic setting step (S21), a first input step (S22), a first numerical analyzing step (S23), a second input step (S24), and a second numerical analyzing step (S25).

Here, in the analysis basic setting step (S21), the wind direction sections, the wind speed sections, and the atmosphere stability sections, which are meteorological variables on which analyses are performed for the analysis area A by the input unit 20, are set.

The following Equation 1 shows wind directions, wind speeds, and atmosphere stabilities on which analyses are performed, respectively, at the time of setting the wind direction sections, the wind speed sections, and the atmosphere stability sections through the analysis basic setting step (S21).

$$\text{Wind direction}(°) = \frac{360}{n1} \times (i-1)$$

$$\text{Wind speed(m/s)} = \frac{u1}{n2} \times (j-1)$$

$$\text{Atmosphere stability}(m) = l1 + \frac{(l2-l1)}{n3} \times (k-1)$$

[Equation 1]

(here, $n1$ = the number of set wind direction sections, $n2$ = the number of set wind speed sections, $n3$ = the number of set atmosphere stability sections, $i$ = integer number of 1 or more to $n1$ or less, $j$ = integer number of 1 or more to $n2$ or less, $k$ = integer number of 1 or more to $n3$ or less, $u1$ = cut-off wind speed of wind power generator, $l2$-$l1$ = (monin-obukhov) length, $l2$ = maximum value of (monin-obukhov) length, $l1$ = minimum value of (monin-obukhov) length)

First, describing the wind direction sections, 360 degrees are divided into a plurality of sections to determine wind directions on which analyses are performed. In the case in which the number of wind direction sections is 16, it means that 360 degrees are divided into sixteen sections at an interval of 22.5 degrees.

Describing the wind speed sections, a wind speed at which an operation of the wind power generator is cut off is divided from 0 m/s into a plurality of sections to determine the number of wind speed analyses performed on specific wind directions.

Generally, a cut-off wind speed at which the operation of the wind power generator is cut off is 25 m/s.

The atmosphere stability sections mean that a monin-obukhov length is set to each of −500 m, −250 m, 0 m, 250 m, and 500 m.

That is, the number of analyses performed on a specific signal analysis point 10 corresponds to the number of set wind direction sections ×the number of set wind speed sections×the number of set atmosphere stability sections.

Here, in the case in which analyses are performed at an interval of one hour in order to perform time sequential analyses on a three-dimensional space for one year, analyses for 8760 cases are required, such that a time required for the analyses cannot but be basically increased.

In the exemplary embodiment of the present disclosure, in the case in which sections are divided into sixteen wind direction sections, five wind speed sections, and five atmosphere stability sections, analyses for 400 (=16×5×5) cases are required, such that the analyses for the atmospheric wind flow may be completed only by analyses of about 10% as compared with the time sequential analyses.

As described above, in the numerical simulation method for an atmospheric wind flow by computational fluid dynamics according to the exemplary embodiment of the present invention, instead of performing the time sequential analyses on the meteorological variables, analysis results for each meteorological variable case are multiplied by an appearance frequency for each case as a weight and are overlapped with each other to meteorological-statistically calculate an average meteorological variable, thereby making it possible to significantly decrease a time required for the analyses.

In addition, in the first input step (S22), input data for a numerical analysis of the numerical analyzing unit 30 are input by the input unit 20.

In the first input step (S22), the boundary condition and the first initial condition of the specific meteorological variable for the same analysis area A in the numerical analyzing unit 30 are input by the first input unit 21 of the input unit 20.

In the first numerical analyzing step (S23), the analysis of the specific wind direction is performed using the boundary condition and the first initial condition input in the first input step (S22) by the numerical analyzing unit 30.

In the second input step (S24), the second initial condition for analyzing another meteorological variable for the analysis area A in the numerical analyzing unit 30 is input by the second input unit 22 of the input unit 20. Here, the second initial condition is set to a value using the analysis information analyzed through the first numerical analyzing step (S23) after the first initial condition is input.

Since a detailed method of using the analysis value analyzed after the first initial condition is input as the second initial condition in the second input step (S24) has been described above, it will be omitted.

In the second numerical analyzing step (S25), the analysis of the specific wind direction is performed using the second initial condition input in the second input step (S24) by the numerical analyzing unit 30.

In the map forming step (S30), the numerical analysis result of the numerical analyzing unit 30 is mapped in connection with the geographical information by the map forming unit 40.

Here, in the map forming step (S30), it is preferable that results to which weights of appearance frequency calculation values for each meteorological variable calculated using actually measured data are imparted are summed up to further increase reliability.

Here, in the numerical simulation method for an atmospheric wind flow by computational fluid dynamics according to the exemplary embodiment of the present invention, the second input step (S24) and the second numerical analyzing step (S25) are repeatedly performed in order to analyze each section of all meteorological variables set for the analysis area A, such that the analyses for the respective meteorological variables are completed.

FIG. 11 is a view illustrating an example of the numerical simulation method for an atmospheric wind flow by computational fluid dynamics according to the exemplary embodiment of the present invention when the wind direction sections, the wind speed sections, and the atmosphere stability section shown in the above Equation 1 are set to 16, 5, and 5, respectively.

Figure 12A:
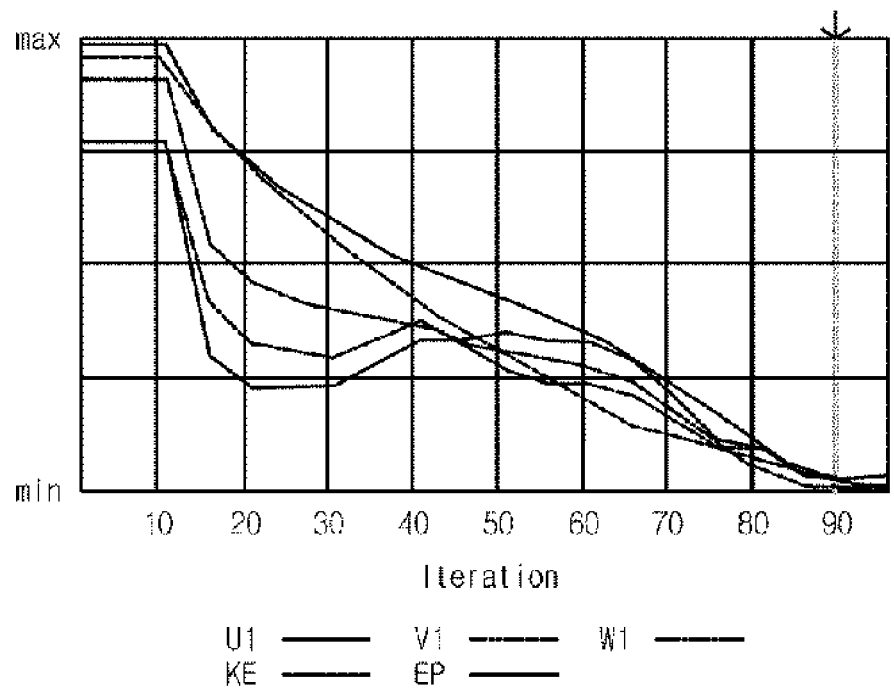
FIGS. 12A to 13B are views illustrating results depending on the numerical simulation system and method for an atmospheric wind flow by computational fluid dynamics according to the exemplary embodiment of the present invention.
Figure 12B:
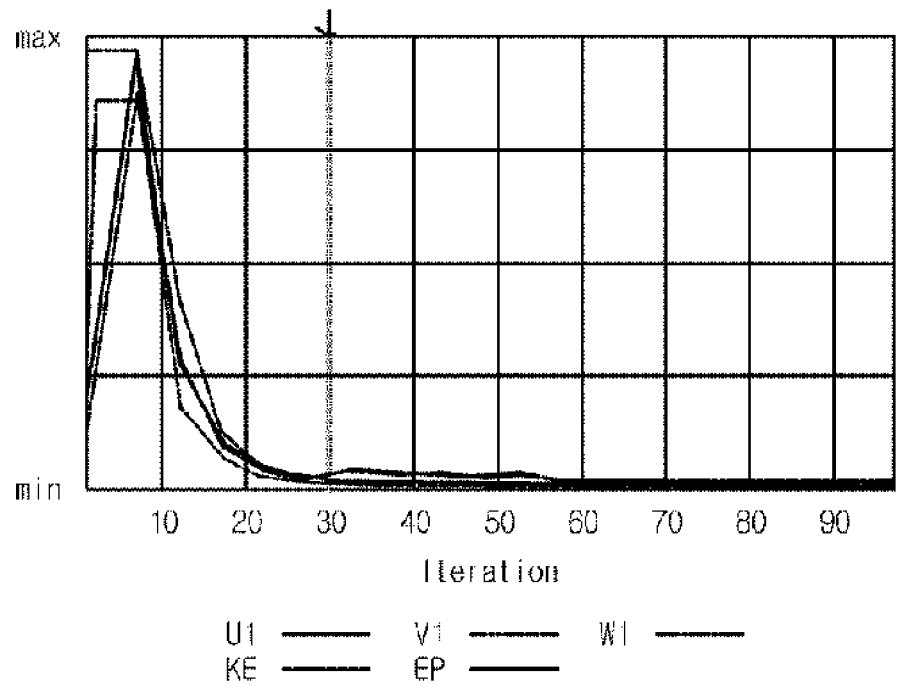
Figure 13A:
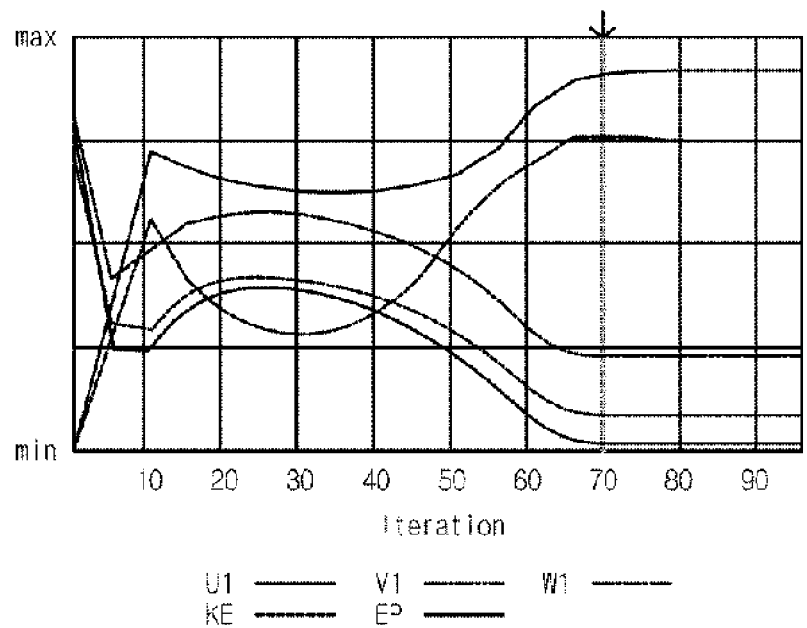
Figure 13B:
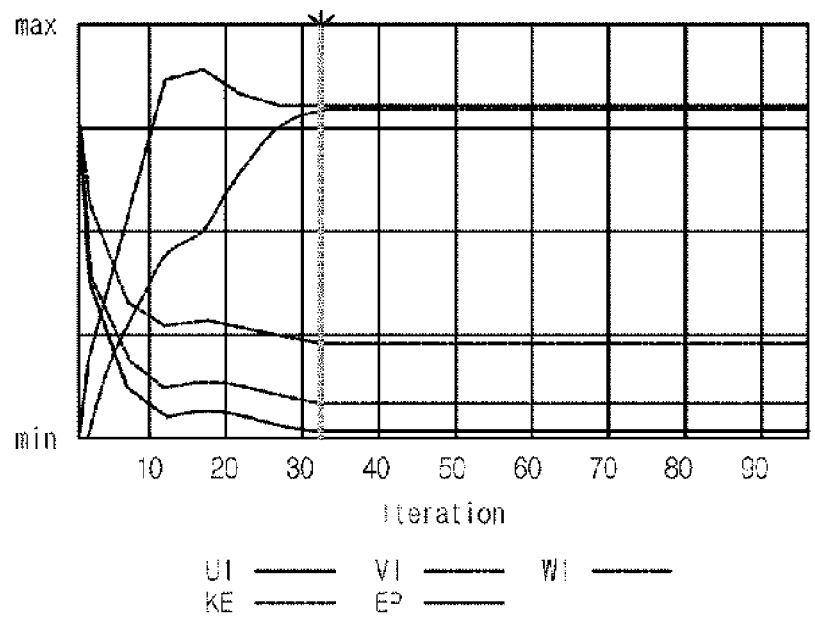

FIGS. 12A to 13B are views illustrating times required for numerical analyses as tables, wherein FIG. 12A illustrates Comparative Example 1 (related art), FIG. 12B illustrates Inventive Example 1, FIG. 13A illustrates Comparative Example 2 (related art), and FIG. 13B illustrates Inventive Example 2.

In more detail, analysis result values when analyses are performed using a wind power resource map making special program (WindSim) using a computer of Xeon CPU X5460 3.16 GHz are illustrated in FIGS. 12A to 13B.

Here, FIGS. 12A and 12B illustrate analysis results of 66×66×20 cells, and FIGS. 13A and 13B illustrate analysis results of 199×199×20 cells.

In addition, in Comparative Example 1, Comparative Example 2, Inventive Example 1, and Inventive Example 2, as illustrated in FIG. 14, sequence 1) a first initial condition is set to 0 with respect to a northerly wind to perform an analysis, sequence 2) an analysis value of the northerly wind is used as a second initial condition for analyzing a southerly wind to perform an analysis, sequence 3) a first initial condition is set to 0 with respect to an easterly wind to perform an analysis, and sequence 4) an analysis value of the easterly wind is used as a second initial condition for analyzing the easterly wind to perform an analysis.

In addition, sequence 5) a first initial condition is set to 0 with respect to a northeasterly wind to perform an analysis, sequence 6) an analysis value of the northeasterly wind is used as a second initial condition for analyzing a southwesterly wind to perform an analysis, sequence 7) a first initial condition is set to 0 with respect to a northwesterly wind to perform an analysis, and sequence 8) an analysis value of the northwesterly wind is used as a second initial condition for analyzing a southeasterly wind to perform an analysis.

In addition, sequence 9) an average value of the analysis values of the northerly wind and the northeasterly wind is used as a second initial condition of a north-northeasterly wind to perform an analysis, sequence 10) an analysis value of the north-northeasterly wind is used as a second initial condition for analyzing a south-southwesterly wind to perform an analysis, sequence 11) an average value of the analysis values of the northerly wind and the northwesterly wind is used as a second initial condition of a north-northwesterly wind to perform an analysis, and sequence 12) an analysis value of the north-northwesterly wind is used as a second initial condition for analyzing a south-southeasterly wind to perform an analysis.

In addition, sequence 13) an average value of the analysis values of the northeasterly wind and the easterly wind is used as a second initial condition of an east-northeasterly wind to perform an analysis, sequence 14) an analysis value of the east-northeasterly wind is used as a second initial condition for analyzing a west-southwesterly wind to perform an analysis, sequence 15) an average value of the analysis values of the northwesterly wind and the westerly wind is used as a second initial condition of a west-northwesterly wind to perform an analysis, and sequence 16) an analysis value of the west-northwesterly wind is used as a second initial condition for analyzing an east-southeasterly wind to perform an analysis.

A time required for obtaining analysis result of the respective numerical values may be significantly decreased in FIG. 12B as compared with in FIG. 12A, and a time required for obtaining analysis result of the respective numerical values may also be significantly decreased in FIG. 13B as compared with in FIG. 13A.

In addition, actually, a time of 1140 seconds (approximately 48%) may be saved in Inventive Example 1 of the numerical simulation method for an atmospheric wind flow by computational fluid dynamics according to the exemplary embodiment of the present invention as compared with Comparative Example 1, and a time of 156 minutes (approximately 32%) may be saved in Inventive Example 2 of the numerical simulation method for an atmospheric wind flow by computational fluid dynamics according to the exemplary embodiment of the present invention as compared with Comparative Example 2.

That is, in the numerical simulation system 100 and method for an atmospheric wind flow by computational fluid dynamics according to the exemplary embodiment of the present invention, the analysis result of the meteorological variable depending on the analysis area A is set as the initial condition (second initial condition in the present invention) of an analysis of another meteorological variable, such that a fluid analysis may be more rapidly and efficiently performed. Therefore, the wind power resource map may be easily made.

The present invention is not limited to the above-mentioned exemplary embodiments, and may be variously applied, and may be variously modified without departing from the gist of the present invention claimed in the claims.

[Detailed Description of Main Elements]

100: numerical simulation system for an atmospheric wind flow by computational fluid dynamics according to an exemplary embodiment of the present invention
10: analysis area lattice data generating unit
20: input unit       21: first input unit
22: second input unit
30: numerical analyzing unit
40: map forming unit
A: analysis area
S10~S70: each step of numerical simulation method for an atmospheric wind flow by computational fluid dynamics according to an exemplary embodiment of the present invention

The invention claimed is:

1. A numerical simulation computing system for an atmospheric wind flow by computational fluid dynamics, comprising:
    a processor executing a plurality of units;
    a numerical analyzing unit analyzing meteorological variables of an internal area using meteorological variables of a boundary surface of an analysis area as boundary conditions;
    an input unit inputting the boundary conditions and an initial condition for a numerical analysis of the numerical analyzing unit and setting analysis sections for a same meteorological variable; and
    a map forming unit mapping a numerical analysis result by the numerical analyzing unit in connection with geographical information and generating a wind power resource map indicating candidate locations in which wind power generators are to be installed, the wind power resource map including a space distribution of the atmospheric wind flow, wherein the input unit includes: a first input unit inputting the boundary conditions and a first initial condition for the analysis area; and a second input unit inputting a second initial condition in which analysis information on a specific boundary condition is reflected in order to analyze different boundary conditions for the analysis area, so as to perform different analyses in the same meteorological variable for the analysis area, wherein the boundary conditions are two adjacent wind directions among an easterly wind, a westerly wind, a southerly wind, and a northerly wind for the analysis area; a wind speed; and an atmosphere stability, wherein the first initial condition is set to 0 or a same value as one or more of the boundary conditions, and wherein the second initial condition is input by reflecting analysis information with respect to wind directions forming an angle of 180 degrees with respect to the respective two adjacent wind directions in which the first initial condition is input or wind directions corresponding to middle directions of the two adjacent wind directions in which the first initial condition is input, where a first data set of wind directions is generated, and a second data set of wind directions, reduced from the first data set, is analyzed to generate the wind power resource map.

2. The numerical simulation computing system of claim 1, wherein the numerical analyzing unit performs an analysis on the atmospheric wind flow for each wind direction section, wind speed section, and atmosphere stability section.

3. The numerical simulation computing system of claim 1, wherein, in a first case in which the first initial condition is a scalar value, the second initial condition is an analysis value depending on the numerical analyzing unit for specific wind directions in which the first initial condition is input with respect to wind directions forming an angle of 180 degrees with respect to the respective adjacent wind directions in which the first initial condition is input.

4. The numerical simulation computing system of claim 3, wherein the first initial condition having the scalar value is any one or more selected among a temperature, turbulent kinetic energy, a turbulent kinetic energy dissipation rate, and a coefficient of kinematic viscosity.

5. The numerical simulation computing system of claim 3, wherein, in a second case in which the first initial condition is a vector value, the second initial condition is an opposite direction value of the analysis value depending on the numerical analyzing unit for the specific wind directions in which the first initial condition is input with respect to the wind directions forming the angle of 180 degrees with respect to the respective adjacent wind directions in which the first initial condition is input.

6. The numerical simulation computing system of claim 3, wherein the second initial condition is an average value of two analysis values depending on the numerical analyzing unit for two specific wind direction boundary conditions in which the first initial condition is input with respect to wind directions corresponding to middle directions of the two specific wind direction boundary conditions in which the first initial condition is input.

7. The numerical simulation computing system of claim 6, wherein, in the first case in which the first initial condition is the scalar value, the second initial condition is an analysis value depending on the numerical analyzing value with respect to a wind direction forming an angle of 180 degrees with respect to a specific wind direction having analysis information depending on the numerical analyzing unit.

8. The numerical simulation computing system of claim 6, wherein, in a second case in which the first initial condition is a vector value, the second initial condition is an opposite direction value of the analysis value depending on the numerical analyzing value with respect to the wind direction forming the angle of 180 degrees with respect to the specific wind direction having the analysis information depending on the numerical analyzing unit.

9. A numerical simulation method for an atmospheric wind flow by computational fluid dynamics using a numerical simulation computing system, the numerical simulation method comprising:

setting lattices for an analysis area by an analysis area lattice data generating unit using terrain data, where the lattices divide a space in which wind flows;

analyzing an atmospheric wind flow for each of wind directions, wind speeds, and atmosphere stabilities set for the analysis area; and mapping each analysis result in connection with geographical information for the analysis area and generating a wind power resource map indicating candidate locations in which wind power generators are to be installed, the wind power resource map including a space distribution of the atmospheric wind flow, wherein analyzing the atmospheric wind flow includes:

setting wind direction sections, wind speed sections, and atmosphere stability sections, each of which are meteorological variables on which analyses are performed for the analysis area;

inputting a boundary condition and a first initial condition of a specific meteorological variable for the same analysis area in the numerical analyzing unit, by a first input unit of an input unit;

performing an analysis of the specific meteorological variable using the boundary condition and the first initial condition, by the numerical analyzing unit;

inputting a second initial condition for analyzing another meteorological variable for the same analysis area in the numerical analyzing unit, by a second input unit of the input unit; and performing an analysis of the specific meteorological variable using the second initial condition, by the numerical analyzing unit, the inputting of the second initial condition and the performing of the analysis of the specific meteorological variable using the second initial condition being repeatedly performed in order to analyze each section of all meteorological variables set for the analysis area, wherein the boundary condition includes two adjacent wind directions among an easterly wind, a westerly wind, a southerly wind, and a northerly wind for the analysis area; a wind speed; and an atmosphere stability, wherein the first initial condition is set to 0 or a same value as the boundary condition, and wherein the second initial condition is input by reflecting analysis information with respect to wind directions forming an angle of 180 degrees with respect to respective specific wind directions in which the first initial condition is input or wind directions corresponding to middle directions of the two adjacent wind directions in which the first initial condition is input.

10. The numerical simulation method for an atmospheric wind flow by computational fluid dynamics of claim 9, wherein, in mapping each analysis result, an appearance frequency for each section of meteorological variables calculated using actually measured data is imparted as a weight to overlap analysis results for all sections with each other, thereby calculating a meteorological-statistically averaged meteorological variable value.

* * * * *